July 30, 1957
E. E. GOEHLER ET AL
2,800,953
SEAT FOR GOLF CART
Filed Nov. 16, 1953
2 Sheets-Sheet 1
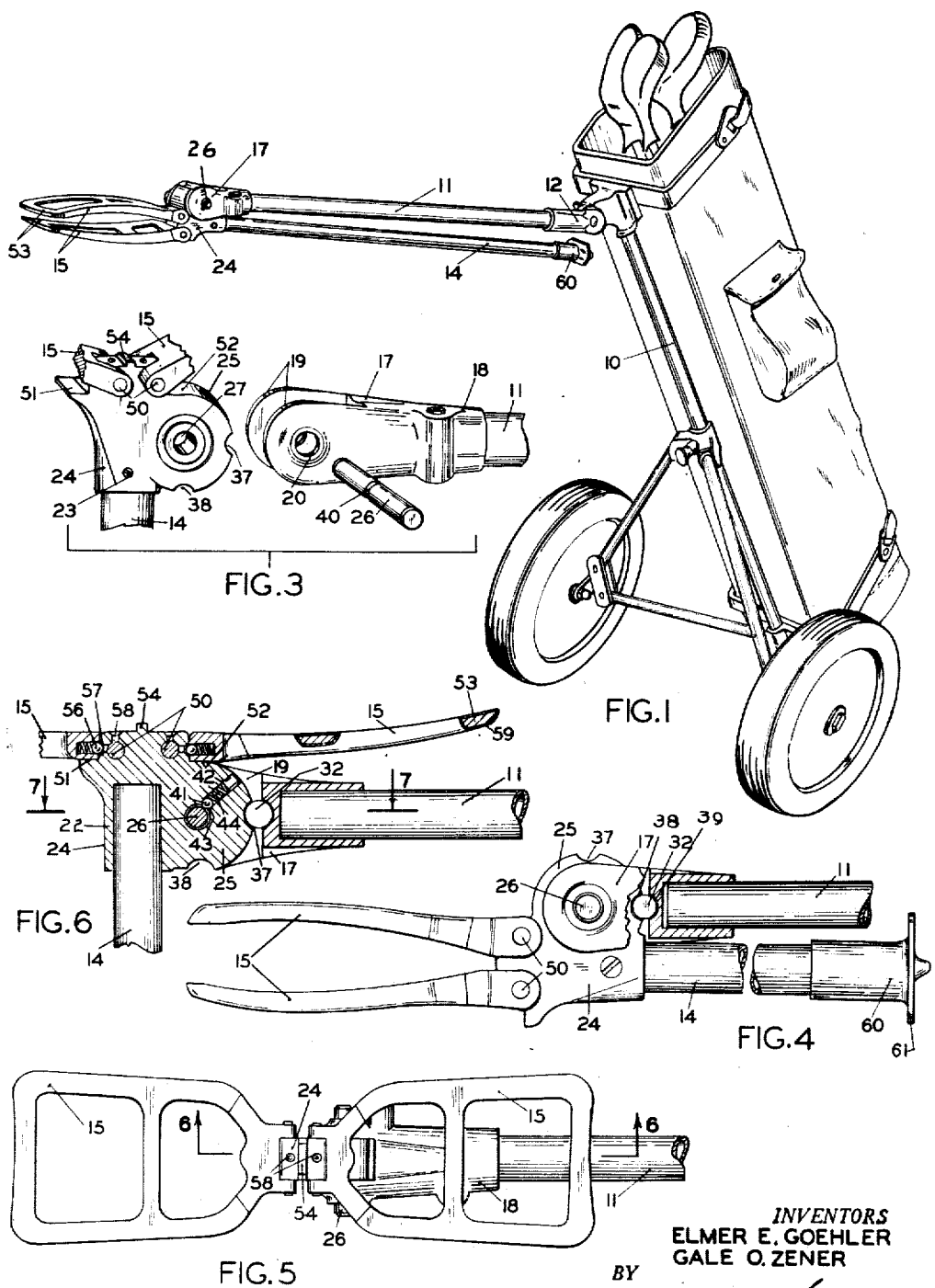
INVENTORS
ELMER E. GOEHLER
GALE O. ZENER
BY
ATTORNEYS

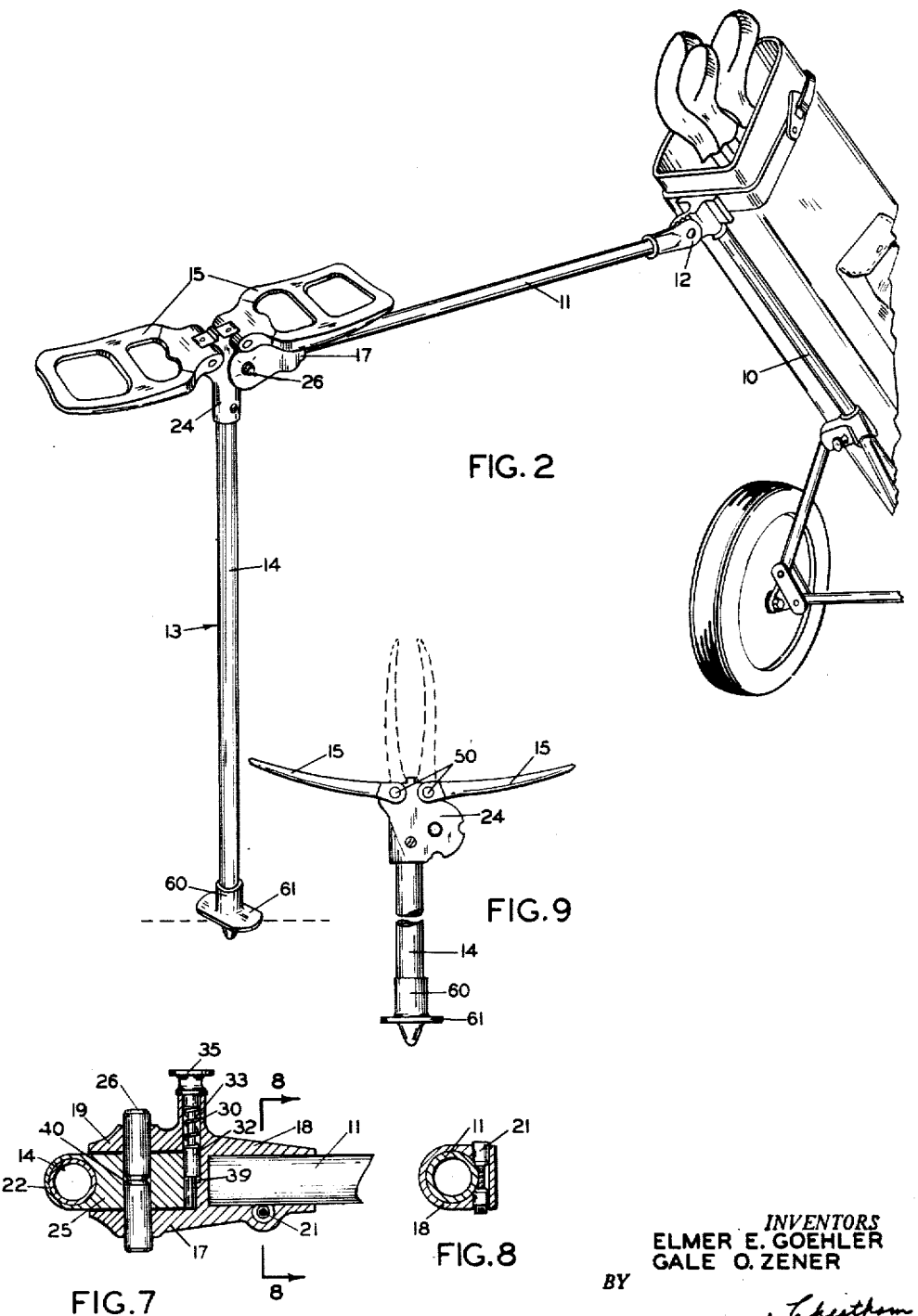

United States Patent Office

2,800,953
Patented July 30, 1957

2,800,953

SEAT FOR GOLF CART

Elmer E. Goehler and Gale Olcott Zener, Portland, Oreg.; said Zener assignor to D. A. Chance, Portland, Oreg.

Application November 16, 1953, Serial No. 392,238

12 Claims. (Cl. 155—135)

The present invention relates to seats and more particularly to a demountable seat adapted to be attached to and used in conjunction with wheeled vehicles such as golf carts and also to be used as a seat independently of the vehicle while watching golf tournaments, horse races or like spectator events.

A very large number, if not a majority, of golf players today utilize golf carts to carry their bags about the golf course. It is frequently necessary for a player to wait his turn at a tee or wait upon the fairway while the preceding players move out of the range of his shot. While benches are generally available at the various tees, all too frequently the benches at the tees will be crowded and on the fairway there are, of course, no such benches available. If a player must stand while he waits, it will sap more of his energy than if he were able to sit, and in the case of players not in peak physical condition, the resulting physical exhaustion may adversely affect the pleasure they would otherwise receive from the game. It has been proposed heretofore to provide a seat upon golf carts but the structures of those seats have been unduly complex and in addition the seats have not been sufficiently convenient to make their use practical.

It is, therefore, a principal object of the invention to provide a seat for a golf cart that is convenient and may be easily used anywhere upon the golf course.

It is a further object of the invention to provide a golf cart seat and mounting structure therefor whereby the seat of the invention may be attached with a minimum of difficulty to existing golf carts.

It is still another object of the invention to provide a demountable seat for golf carts that may be easily detached and used separately in watching sporting events such as golf tournaments and the like.

Other objects and advantages of the invention will become more apparent hereinafter.

In accordance with the present invention, a seat structure quite similar to the conventional shooter's stick or spectator's seat is removably attached to the end of the handle of a golf cart. The pedestal of the seat is hinged upon the handle so that it may be swung from a seat supporting position extending at right angles to the handle to a collapsed position wherein the pedestal extends closely adjacent and substantially parallel to the handle. The mounting structure is such that the seat may be detached for use as a spectator's seat and remounted upon the golf cart handle without the use of tools of any sort.

For more detailed descriptions of the invention, reference is made to the accompanying drawings wherein:

Fig. 1 is a perspective view of the golf cart with the seat of the invention attached and showing the seat in a collapsed position;

Fig. 2 is a perspective view of the golf cart showing the seat positioned for use;

Fig. 3 is an exploded perspective view of the mechanism for attaching the seat to the handle;

Fig. 4 is an enlarged fragmentary side elevation of the golf cart handle and seat in its collapsed position, certain of the parts being broken away to show details of the structure;

Fig. 5 is a plan view of the seat in its operative position;

Fig. 6 is a sectional view taken along line 6—6 of Fig. 5;

Fig. 7 is a cross-sectional view taken substantially along line 7—7 of Fig. 6;

Fig. 8 is a cross-sectional view taken along line 8—8 of Fig. 7; and

Fig. 9 is a fragmentary view showing how the detached seat may be used separately from the cart.

The seat of the invention is shown in connection with a typical collapsible golf cart having a frame indicated generally at 10 for supporting a golf bag and a tubular handle 11 adjustably attached at 12 to the top of the frame and extending therefrom, by which the cart may be pushed or pulled. In accordance with the invention, a seat means preferably formed of aluminum or other suitable lightweight metal is provided at the end of the handle 11, the seat means including a seat forming platform and a hinged supporting post, and may comprise a shooter's stick or spectator's seat 13 including a supporting post or pedestal 14 and a pair of seat forming leaves 15 hingedly connected to the top of the pedestal. The seat 13 is so mounted upon the handle 11, by means hereinafter described, that the pedestal 14 may be moved from a collapsed position wherein the pedestal is closely adjacent and parallel with the handle, as shown in Fig. 1, to an operative seat supporting position as shown in Fig. 2, and in which the pedestal extends downwardly substantially at right angles to the handle.

Referring now more particularly to Fig. 3, the spectator's seat 13 is attached to the handle by a hinge or knee-joint mechanism, including a mounting head 17 secured to the end of the handle and comprising a collar 18 adapted to receive the end of the handle 11 and a fork or yoke 19 having a pair of horizontally spaced apart arms having aligned circular openings 20 extending therethrough. The mounting head may be secured to the handle 11 by any suitable means, the head, in this instance, being secured to the handle by a double plug and screw fastener indicated by the numeral 21 and shown most clearly in Fig. 8.

Secured to the top of the pedestal 14 is a pivot block 24 having a barrel portion 22 in which the pedestal 14 is received and secured thereto by suitable means such as a setscrew 23, and formed with a flat-sided boss 25 adapted to be received cooperatively between the arms of the yoke 19. The boss 25 and yoke 19 are hingedly connected by a pivot pin 26 which extends through the openings 20 of the yoke arms and a cooperative opening 27 formed in the boss 25. Preferably the pin 26 is of such length that it extends outwardly upon each side of the yoke 19.

Latch means are provided for securing the pedestal in the collapsed position thereof or alternately in the operative position thereof. One of the yoke arms is provided with a tubular projection 30 having an opening which extends parallel to the yoke openings 20, and in which is mounted a latching pin or plunger 32 normally biased into the space between the arms of the yoke by a suitably retained spring 33. A manually engageable head 35 is provided on the outer end of the latch for withdrawing the latching plunger from between the arms of the yoke 19. The boss 25 is formed with a cylindrical surface concentric with the boss opening 27, and interrupted by a pair of semicircular apertures or recesses 37, 38 which extend transversely of the boss in a direction parallel with the axis of the opening 27. One of the boss recesses 37 is positioned to receive the latching plunger 32 in latching engagement when the pedestal is in the operative seat supporting position, as shown in Fig. 6. The other recess 38 is positioned to receive the latching plunger 32 when the pedestal 14 is in the collapsed position as shown in Fig. 4. In either instance the pedestal 14 will be latched in position and cannot be moved relative to the handle 11 until the plunger 32 is withdrawn. However, the position of the pedestal may be easily and quickly changed merely by manually retracting the plunger from engagement in the respective recess 37 or 38, and thereafter manually swinging the pedestal to the other position thereof. The spring 33 will automatically bias the plunger 32 into the corresponding recess as the pedestal reaches the new position. So that any load imposed upon the plunger 32 will be transmitted directly to the mounting head 17 without imposing shear stress upon the plunger, the plunger preferably slides in a cooperating recess 39 formed in the bight of the yoke 19.

Preferably the mounting of the spectator seat 13 upon the handle 11 is so arranged that the seat may be detached from the cart in the event that it is desired to use the seat while watching a golf tournament or the like. In the present instance this may be done by manually grasping an exposed end of the pivot pin 26 and withdrawing the pin from the yoke 19 and boss 25 whereupon the boss may be removed from the yoke. The seat may be reattached simply by reversing the procedure. Preferably releasable detent means are provided to prevent accidental removal of the pivot pin 26 and such means may comprise a circumferential semicircular groove 40 formed in the pivot pin midway of its opposite ends, which groove is adapted to be engaged by a spring biased ball 41 projecting inwardly of the boss opening 27. The ball 41 is retained within a bore 42 formed in the boss 25 and having a diameter slightly greater than the ball so that the ball may move freely therein. The walls of the bore converge immediately adjacent the wall of the opening 27 to define a lip 43 which engages the ball to retain it within the bore but permits the ball to protrude slightly into the opening 27 so that it may engage in the pin groove 40. A suitably retained compression spring 44 is provided to bias the ball into the opening 27. The ball 41 automatically retracts when the pivot pin 26 is moved manually as the pin is installed or removed from its hinging position. The detached seat is shown in Fig. 9, the leaves 15 being shown in their seat forming position in solid lines and in their handgrip position in dotted lines, in which latter position the leaves are positioned for convenience in carrying the seat about.

The seat leaves 15 are webbed and may be slightly cupped to form a comfortable seat platform, but for convenience of description will be considered as substantially planar members. The leaves 15 are hinged to the pivot block 24 by means of hinge pins 50 and preferably the hinge pins are parallel to the pivot pin 26 so that the leaves may form a seat upon which the user may sit facing at right angles to the cart handle 11. Thus seated, the handle 11 provides a rest for a hand of the user. The leaves 15 are adapted to be moved from a handgrip position, as shown in Fig. 1, in which the leaves extend outwardly from the end of the pedestal 14 closely adjacent one another and substantially parallel to the axis of the pedestal, to a seat platform forming position, as shown in Fig. 2 in which the leaves extend outwardly of the pedestal 14 substantially at right angles thereto. In the handgrip position of the leaves the adjacent endmost webs 53 of the seat leaves provide a comfortable handle for guiding the cart or carrying the detached seat, while a comfortable seat is provided as mentioned before when the leaves are in their seat forming position. Shoulder means 51, 52 are provided upon the pivot block to engage and support the leaves in their seat platform forming position. Likewise an abutment 54 is provided upon the pivot block to engage the leaves and support them in their handgrip position. To prevent accidental displacement of the leaves from either of their positions, resilient interengaging catch means are provided which, in this instance, comprise a spring biased ball 56 suitably mounted in each leaf and adapted to engage alternately in detent openings indicated at 57 and 58 formed in the pivot block 24.

The seat leaves 15 are preferably provided with a coating 59 (Fig. 6) of plastic or similar heat insulating material to increase the comfort of the seat when it is used in cold weather.

The lower end of the pedestal 14 may be provided with a pointed spud 60 formed with a flange 61 to engage the surface of the ground and prevent penetration thereof if the ground is overly soft.

When the seat is in use the pedestal 14 should be substantially perpendicular to the ground so that substantially the entire load will be carried by the pedestal and little strain will be imposed upon the mounting mechanism. Thus the angular position of the handle 11 relative to the cart frame should be adjusted so that the handle will be horizontal when the cart is on level ground and the spud 60 engages the ground. It should be noted that the pedestal and cart wheels form a steady triangular base when the seat is in use.

The spectator seat 13 and mounting head 17 form a unit that may be easily and quickly mounted upon any golf cart having a handle projecting from the cart frame. While the mounting head 17 is shown as formed with a collar 18 for engaging the tubular handle 11, obviously other arrangements could be utilized to fit the particular situation.

Having illustrated and described a preferred embodiment of the invention, it should be apparent to those skilled in the art that the invention permits of modification in arrangement and detail. We claim as our invention all such modifications as come within the true spirit and scope of the appended claims.

We claim:

1. The combination comprising a golf cart including an outwardly projecting handle, and a seat means including an elongate pedestal hingedly connected adjacent one end thereof to the end of said handle for movement from a collapsed position closely adjacent and parallel to said handle to an operative position extending downwardly substantially at right angles to the handle, and a pair of symmetrical, substantially planar, webbed handgrip and seat leaves pivotally mounted on said pedestal end, each of said leaves being movable from a handgrip position with the leaf extending outwardly from the end of said pedestal and substantially parallel thereto to a seat platform position with the leaf extending outwardly of the pedestal substantially at right angles thereto, said leaves being mounted to pivot about an axis substantially perpendicular to the plane common to said handle and said pedestal in the operative position thereof.

2. In combination, a golf cart including a handle adapted to project outwardly therefrom, a spectator seat including a supporting post, knee joint means hingedly mounting said spectator seat upon the end of said handle for movement of said post from a collapsed position adjacent and parallel to said handle to an operative position extending downwardly substantially at right angles to said handle, said knee joint means including a pair of hinged members and a removable pivot pin detachably securing said members together, said pin being removable to permit detachment of said seat from said handle.

3. In combination, a golf cart including a bag supporting frame and an outwardly extending handle mounted on said frame, a spectator seat including an elongate supporting post, knee joint means hingedly mounting said spectator seat upon the end of said handle and including a removable pivot pin removable to permit disengagement of said seat from said handle, said supporting post having a collapsed position substantially parallel to and closely adjacent said handle and an operative position extending downwardly and substantially at right angles to said handle, and latch means to latch said supporting post in either of said positions.

4. In combination, a cart including a load supporting frame and an outwardly extending handle mounted on said frame, and seat means hingedly mounted on the rearward end of said handle, a seat means mounting head on said handle rearward end comprising a yoke, said seat means comprising an elongate supporting post having a pivot block at one end thereof including a boss received cooperatively in said yoke, a horizontally disposed pivot pin extending through said boss and yoke whereby said pedestal is movable from a collapsed position substantially parallel to and closely adjacent said handle to an operative position extending downwardly and substantially at right angles to said handle, and a spring biased ball detent means for preventing accidental longitudinal movement of said pivot pin but permitting removal of the pivot pin to detach said seat means from said handle, and seat platform means mounted on said pivot block.

5. In combination, a golf cart including a bag supporting frame and a rearwardly extending handle mounted on the upper end of said frame, and seat means hingedly mounted on the rearward end of said handle, a seat means mounting head on said handle rearward end comprising a pair of horizontally spaced apart forks, said seat means comprising an elongate pedestal having a pivot block at one end thereof including a boss received cooperatively between said forks, a horizontally disposed pivot pin extending through said boss and said forks whereby said pedestal is movable from a collapsed position substantially parallel to and closely adjacent said handle to an operative position extending downwardly and substantially at right angles to said handle, cooperative latch means on said mounting head and boss adapted alternately to latch said pedestal in the operative or collapsed position, and a pair of substantially planar handgrip and seat platform forming leaves hingedly secured to said pivot block, each of said leaves being movable from a handgrip position with the leaf extending outwardly from and substantially parallel to the axis of said pedestal to a seat platform position extending outwardly of the pedestal substantially at right angles thereto.

6. In combination, a golf cart including a bag supporting frame and an outwardly extending handle, and seat means hingedly mounted on the end of said handle, a seat means mounting head on said handle end comprising a pair of horizontally spaced apart forks, said seat means comprising an elongate pedestal having a pivot block at one end thereof including a boss received cooperatively between said forks, a horizontally disposed pivot pin extending through said boss and forks whereby said pedestal is movable from a collapsed position substantially parallel to and closely adjacent said handle to an operative position extending downwardly and substantially at right angles to said handle, a spring biased latch pin in said mounting head and cooperative pin receiving apertures in said boss adapted alternately to receive said latching pin to maintain said pedestal in the operative or collapsed position, a spring biased ball mounted in said boss, and a circumferential groove in said pivot pin cooperatively engaged by said ball for releasably retaining said pivot pin in hinging position but permitting removal thereof from said boss and forks to detach said seat means from said handle, a pair of substantially planar handgrip and seat platform forming leaves hingedly secured to said pivot block, each of said leaves being movable from a handgrip position with the leaf extending outwardly from and substantially parallel to the axis of said pedestal to a seat platform position extending outwardly of the pedestal substantially at right angles thereto, cooperative stop means on said leaves and said pivot block limiting the angular movement of said leaves between said positions thereof, and resilient interengaging catch means on said leaves and said block to prevent accidental displacement of said leaves from either of said positions.

7. A seat attachment for a golf cart having a handle projecting therefrom, said attachment comprising a spectator seat having a pedestal, and hinge means including a member adapted to be secured to the end of said handle for hingedly mounting said pedestal for movement from a collapsed position closely adjacent and parallel to said handle to an operative position extending downwardly at right angles to said handle.

8. An attachment for a golf cart having a rearwardly extending handle, said attachment comprising a spectator seat including a supporting post and a seat platform means secured to one end of said post, and means for hingedly mounting said spectator seat on the end of said handle comprising a knee joint mechanism including a yoke member and a pivot member pivotally connected, one of said members being secured to said supporting post adjacent said seat platform means, the other of said members pivoting in a plane intersecting and parallel to said supporting post and being adapted to be secured to said handle member whereby said supporting post may be moved from a collapsed position closely adjacent to and parallel with said handle to an operative position extending outwardly substantially at right angles to said handle.

9. A seat device for attachment to the end of a golf cart handle, said seat device comprising an elongate support post having a pair of seat forming leaves on one end thereof and means for mounting said post on said handle comprising a boss on said post, a yoke, a removable pivot pin for hingedly connecting said yoke to said boss for swinging movement in a plane parallel to and intersecting the axis of said post, releasable detent means for preventing accidental removal of said pivot pin from the hinging position thereof but permitting removal of said pivot pin for disengagement of said boss and said yoke, and means on said yoke for attaching the same to the end of said handle whereby said post may be swung from a collapsed position closely adjacent and substantially parallel to said handle to an operative position extending outwardly substantially at right angles to said handle.

10. A seat device for attachment to the end of a golf cart handle, said seat device comprising an elongate support post having a pair of seat forming leaves on one end thereof, and mounting means comprising a boss on said post, a yoke, a pivot pin for hingedly connecting said yoke to said boss for swinging movement in a plane parallel to and intersecting the axis of said post, means on said yoke for attaching the same to the end of said handle whereby said post may be swung from a collapsed position closely adjacent and parallel with said handle to an operative position extending outwardly substantially at right angles to said handle, and manually operative latch means on said boss and said yoke for latching said boss and said yoke in position relative to said collapsed and operative positions of said post.

11. A seat device for attachment to the end of a golf cart handle, said seat device comprising an elongate support post having a pair of seat forming leaves on one end thereof, and mounting means comprising a boss on said post adjacent said one end, a yoke, a removable pivot pin for hingedly connecting said yoke to said boss for swinging movement in a plane parallel to and intersecting the axis of said post, releasable detent means for preventing accidental removal of said pivot pin from the hinging position thereof but permitting removal of said pivot pin for disengagement of said boss and said yoke, means on said yoke for attaching the same to the end of said handle whereby said post may be swung from a collapsed position closely adjacent and parallel with said handle to an operative position extending outwardly substantially at right angles to said handle, and manually operative latch means on said boss and said yoke for latching said boss and said yoke in positions relative to said collapsed and operative positions of said post.

12. A seat device for attachment to the end of a golf cart handle, said seat device comprising an elongate support post having a pair of seat forming leaves hingedly mounted on the top end thereof and having a handgrip position in which the leaves are folded upwardly and closely adjacent one another and a seat platform position in which the leaves extend outwardly from the post substantially at right angles thereto and in relatively opposite directions, and mounting means comprising a boss on said post, a yoke, a removable pivot pin for hingedly connecting said yoke to said boss for swinging movement in a plane parallel to and intersecting the axis of said post, releasable detent means for preventing accidental removal of said pivot pin from the hinging position thereof but permitting removal of said pivot pin for disengagement of said boss and said yoke, means on said yoke for attaching the same to the end of said handle whereby said post may be swung from a collapsed position closely adjacent and parallel with said handle to an operative position extending outwardly substantially at right angles to said handle, and manually operative latch means on said boss and said yoke for latching said boss and said yoke in positions relative to said collapsed and operative positions of said post.

References Cited in the file of this patent

UNITED STATES PATENTS

| 504,326 | Chapman | Sept. 5, 1893 |
| 1,241,753 | Mills | Oct. 2, 1917 |
| 1,697,552 | Brooks | Jan. 1, 1929 |
| 1,957,033 | Silverman | May 1, 1934 |
| 2,673,589 | Kunkel | Mar. 30, 1954 |
| 2,726,875 | Murcott | Dec. 13, 1955 |

FOREIGN PATENTS

| 204,550 | Great Britain | Oct. 4, 1923 |

UNITED STATES PATENT OFFICE

CERTIFICATE OF CORRECTION

Patent No. 2,800,953                      July 30, 1957

Elmer E. Goehler et al.

It is hereby certified that error appears in the above numbered patent requiring correction and that the said Letters Patent should read as corrected below.

In the grant, lines 2 and 3, for "said Zener assignor to D. A. Chance, of Portland, Oregon," read -- said Zener assignor of one-fourth to D. A. Chance, Portland, Oregon, --; line 12, for "Elmer E. Goehler and D. A. Chance, their heirs or assigns" read -- Elmer E. Goehler, Gale Olcott Zener, and D. A. Chance, their heirs or assigns --; in the heading to the printed specification, line 4, for "said Zener assignor to D. A. Chance, Portland, Oreg." read -- said Zener assignor of one-fourth to D. A. Chance, Portland, Oreg. --.

Signed and sealed this 15th day of October 1957.

(SEAL)
Attest:

KARL H. AXLINE

Attesting Officer

ROBERT C. WATSON
Commissioner of Patents